United States Patent [19]
Barnett

[11] Patent Number: 5,762,316
[45] Date of Patent: Jun. 9, 1998

[54] VALVE MECHANISM WITH IMPROVED SEALING

[75] Inventor: Donald Lee Barnett, Newman, Ill.

[73] Assignee: Kraft Foods, Inc., Northfield, Ill.

[21] Appl. No.: 539,302

[22] Filed: Oct. 4, 1995

[51] Int. Cl.$^6$ ............................................. F16K 31/122
[52] U.S. Cl. ................................. 251/63.5; 251/324
[58] Field of Search .......................... 251/63.5, 324

[56] References Cited

U.S. PATENT DOCUMENTS

| | | |
|---|---|---|
| 1,326,053 | 12/1919 | Henry . |
| 2,398,870 | 4/1946 | Thornhill . |
| 2,728,547 | 12/1955 | Crookston et al. . |
| 2,778,598 | 1/1957 | Bolling, Jr. . |
| 2,814,307 | 11/1957 | Hafele et al. . |
| 3,036,807 | 5/1962 | Lucky et al. . |
| 3,037,245 | 6/1962 | Darnell . |
| 3,774,638 | 11/1973 | Kriett . |
| 3,809,127 | 5/1974 | Gilbert . |
| 3,898,862 | 8/1975 | Kerschbaumer et al. ............ 251/63.5 |
| 3,927,859 | 12/1975 | Raaphorst . |
| 4,023,355 | 5/1977 | McDonald . |
| 4,040,600 | 8/1977 | Coppola et al. ................... 251/63.5 |
| 4,149,555 | 4/1979 | Hardesty . |
| 4,190,073 | 2/1980 | Claycomb . |
| 4,190,873 | 2/1980 | Klokkers . |
| 4,209,040 | 6/1980 | Peters . |
| 4,215,845 | 8/1980 | Sturgeon . |
| 4,257,442 | 3/1981 | Claycomb . |
| 4,285,495 | 8/1981 | King ................................... 251/63.5 |
| 4,374,582 | 2/1983 | Heyneman . |
| 4,378,335 | 3/1983 | Boden et al. . |
| 4,484,545 | 11/1984 | Madsen . |
| 4,535,966 | 8/1985 | Post et al. . |
| 4,730,806 | 3/1988 | Krasnov . |
| 4,795,131 | 1/1989 | Scarano et al. . |
| 4,850,394 | 7/1989 | Imhof et al. . |
| 4,933,569 | 6/1990 | Merchlewitz . |
| 5,022,358 | 6/1991 | Richeson . |
| 5,105,852 | 4/1992 | Wagner . |
| 5,309,934 | 5/1994 | Jaeger . |

*Primary Examiner*—A. Michael Chambers
*Attorney, Agent, or Firm*—Fitch, Even, Tabin & Flannery

[57] ABSTRACT

A dispensing valve suitable for food processing and other applications has a valving plunger formed as an integral part of a pneumatic piston. A valve seat receives the plunger end of the piston to perform a valving operation. The remainder of the piston includes chambering for pressurized air flow, moving the piston back and forth so as to operate the valve between closed and open positions.

22 Claims, 6 Drawing Sheets

VALVE MECHANISM WITH IMPROVED SEALING

BACKGROUND OF THE INVENTION

1. Field of the Invention

The present invention pertains to valve mechanisms and in particular to valve mechanisms such as those used in food processing equipment, in which a positive, reliable sealing of the valve is required.

2. Description of the Related Art

A variety of special purpose valves are required in critical situations of many types. For example, some valves may be required to operate in hostile environments, with problems arising from the chemical nature of the fluid flow being valved, or from extreme pressure or temperature operating ranges in which flow is maintained. There may be other types of critical applications for a valve, requiring extremely high performance. In the food processing environment, for example, product flows are often directly associated with the wholesomeness and attractiveness of the finished food product. Not only must contamination be strictly avoided in food processing equipment, different product streams must be maintained separate in order to avoid unintentional mixing which may impair the desirability of the resulting product.

Problems have been encountered in commercial food cookers of the type which process batches of food products which travel in a continuous path into and out of the cooker. It is important, for example, that cooked and uncooked food products be kept separate from one another and that valves used to close off a cooker provide a positive, reliable seal despite repeated, oftentimes unattended operation.

SUMMARY OF THE INVENTION

It is an object of the present invention to provide a valve mechanism offering improved closing reliability.

Another object of the present invention is to provide a valve mechanism of the above-described type, which is suitable for use in food processing equipment.

Another object according to the principles of the present invention is to provide a valve mechanism of the above-described type which is easily cleanable and which affords ready maintenance of its various operating components.

These and other objects according to the principles of the present invention which will become apparent from the appended description and drawings, are provided in a valve and valve operator apparatus, comprising:

- a housing having a first end with a valve seat and a second end, and a housing wall therebetween;
- a valve assembly including a piston having a first end with a plunger for engaging the valve seat to block flow therethrough, a second end and a piston wall therebetween;
- a sealing ring outwardly extending from the piston wall;
- a cylinder surrounding said piston, having a fist end adjacent said valve seat and a second end remote from said valve seat;
- a mounting means for mounting the cylinder about said piston;
- first signal connection means for connecting a first pressure signal between said sealing ring and the second end of said cylinder;
- second signal connection means for connecting a second pressure signal between said sealing ring and the first end of said cylinder; and at least a portion of said piston movable back and forth in said cylinder with pressure signals alternately applied to said first and said second signal connection means, whereby said plunger is moved into and out of engagement with said valve seat.

DETAILED DESCRIPTION OF THE PREFERRED EMBODIMENT

Figure 1:
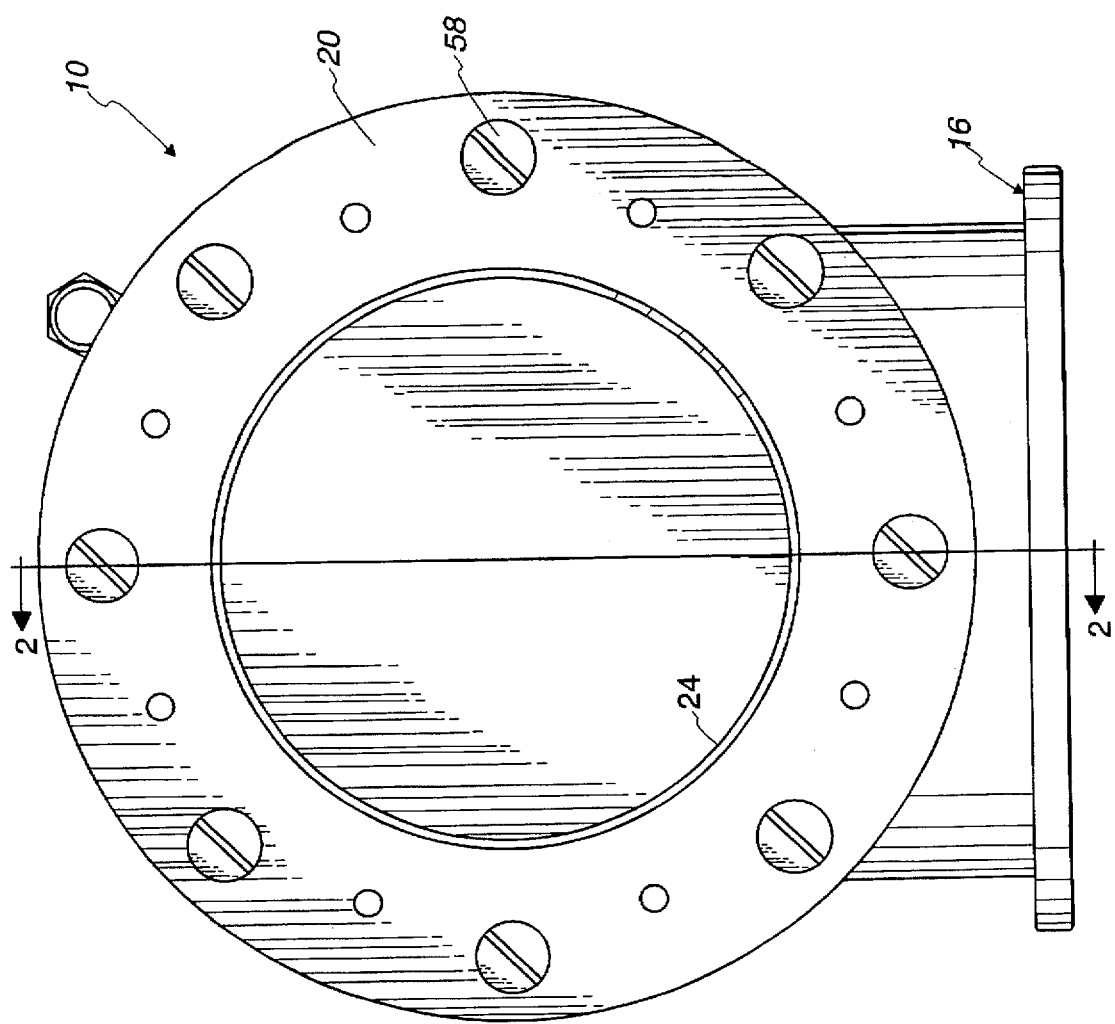
FIG. 1 is an end view of a valve mechanism according to the principles of the present invention.
Figure 2:
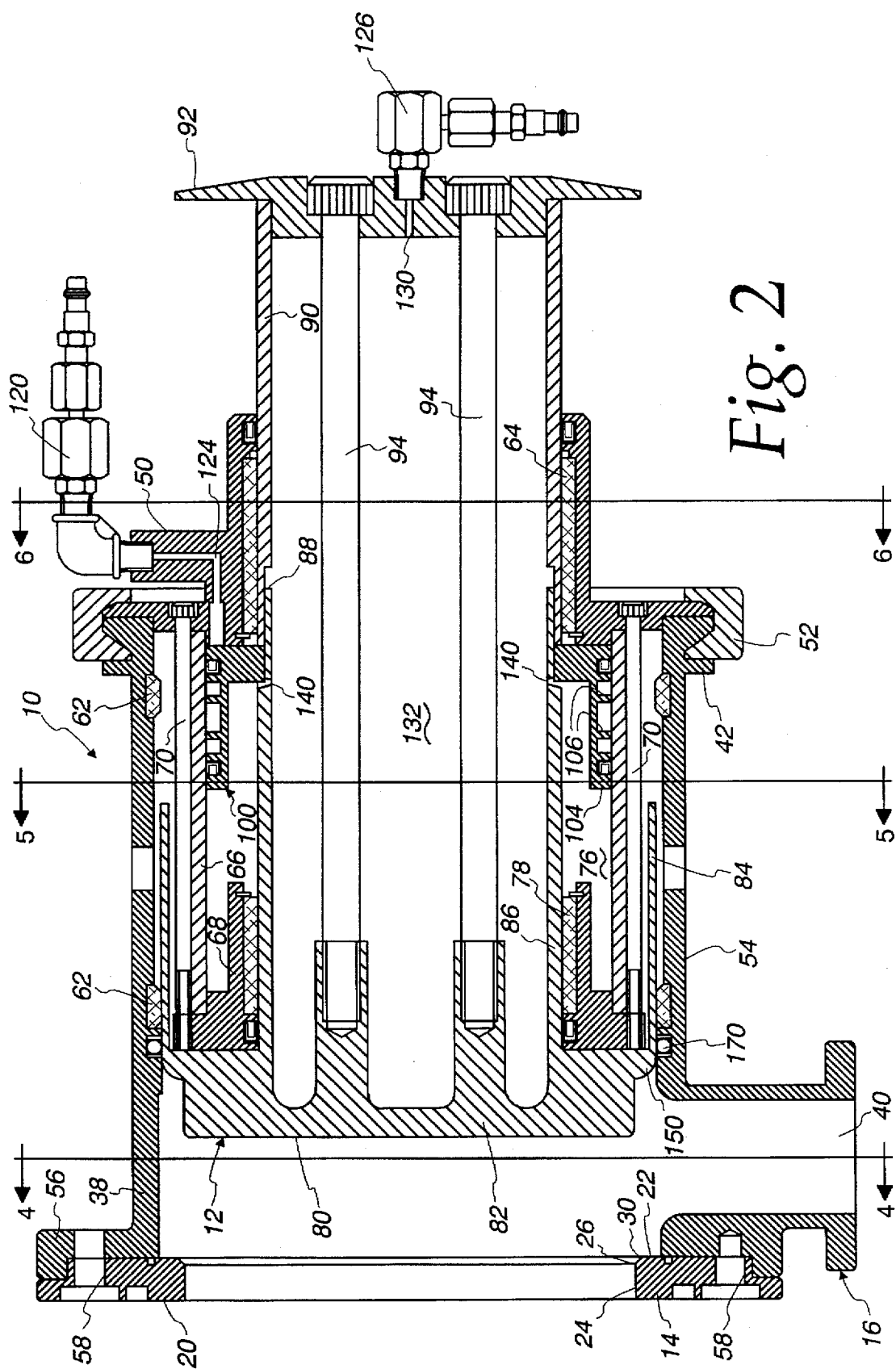
FIG. 2 is a cross-sectional view taken along the line 2—2 in FIG. 1, showing the valve in an open position.
Figure 3:
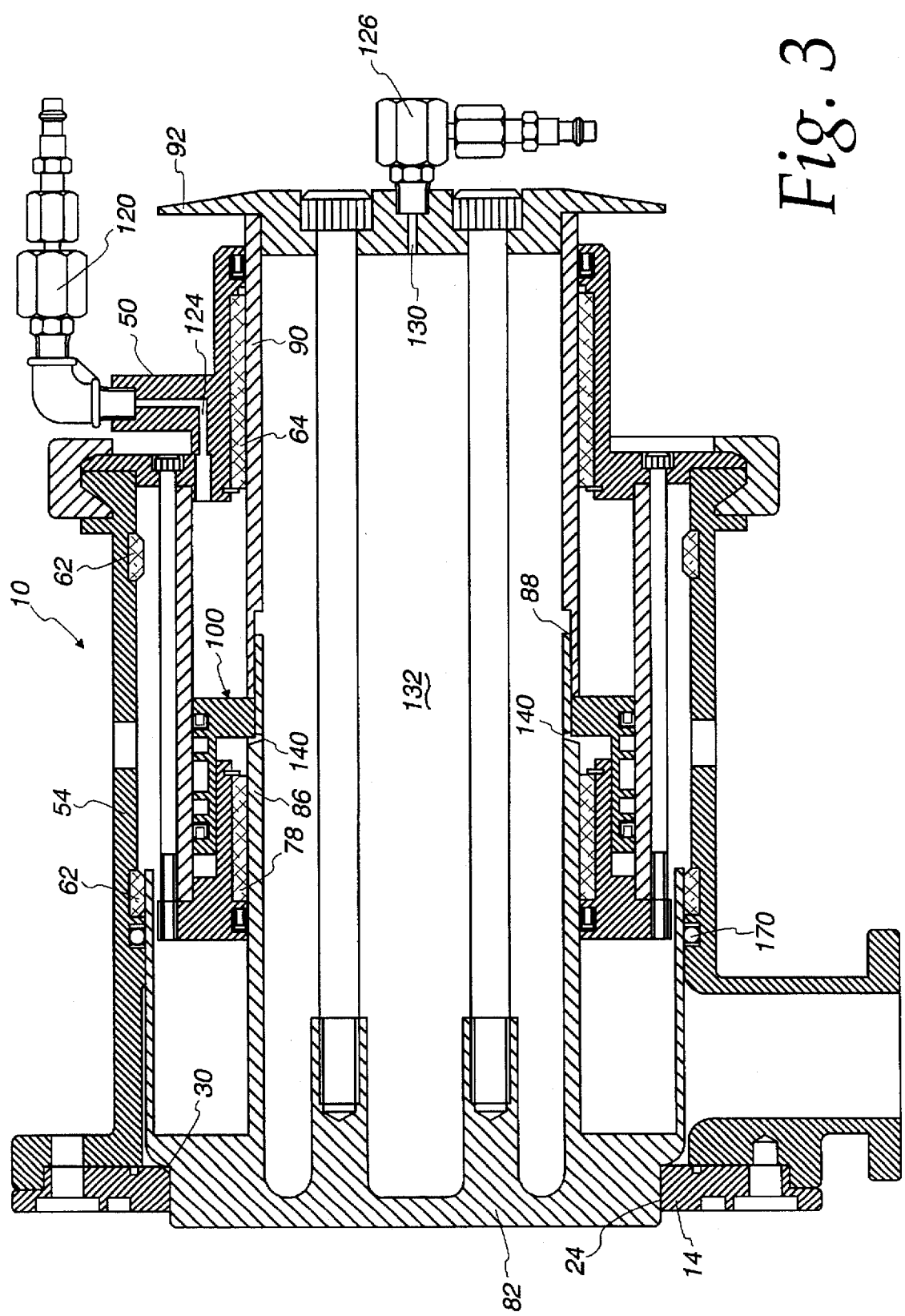
FIG. 3 is a view similar to that of FIG. 2, but showing the valve in a closed position.
Figure 4:
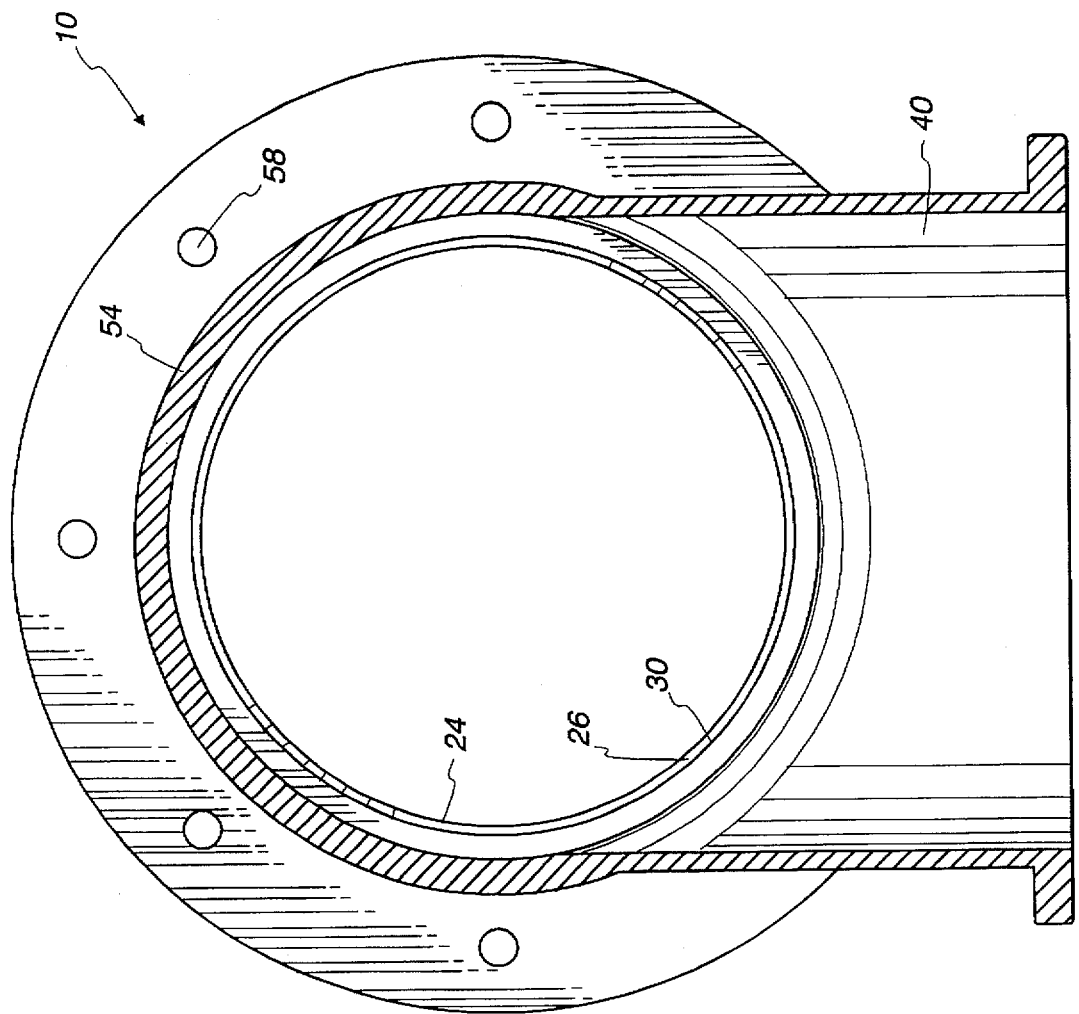
FIG. 4 is a cross-sectional view taken along the line 4—4 of FIG. 2.
Figure 5:
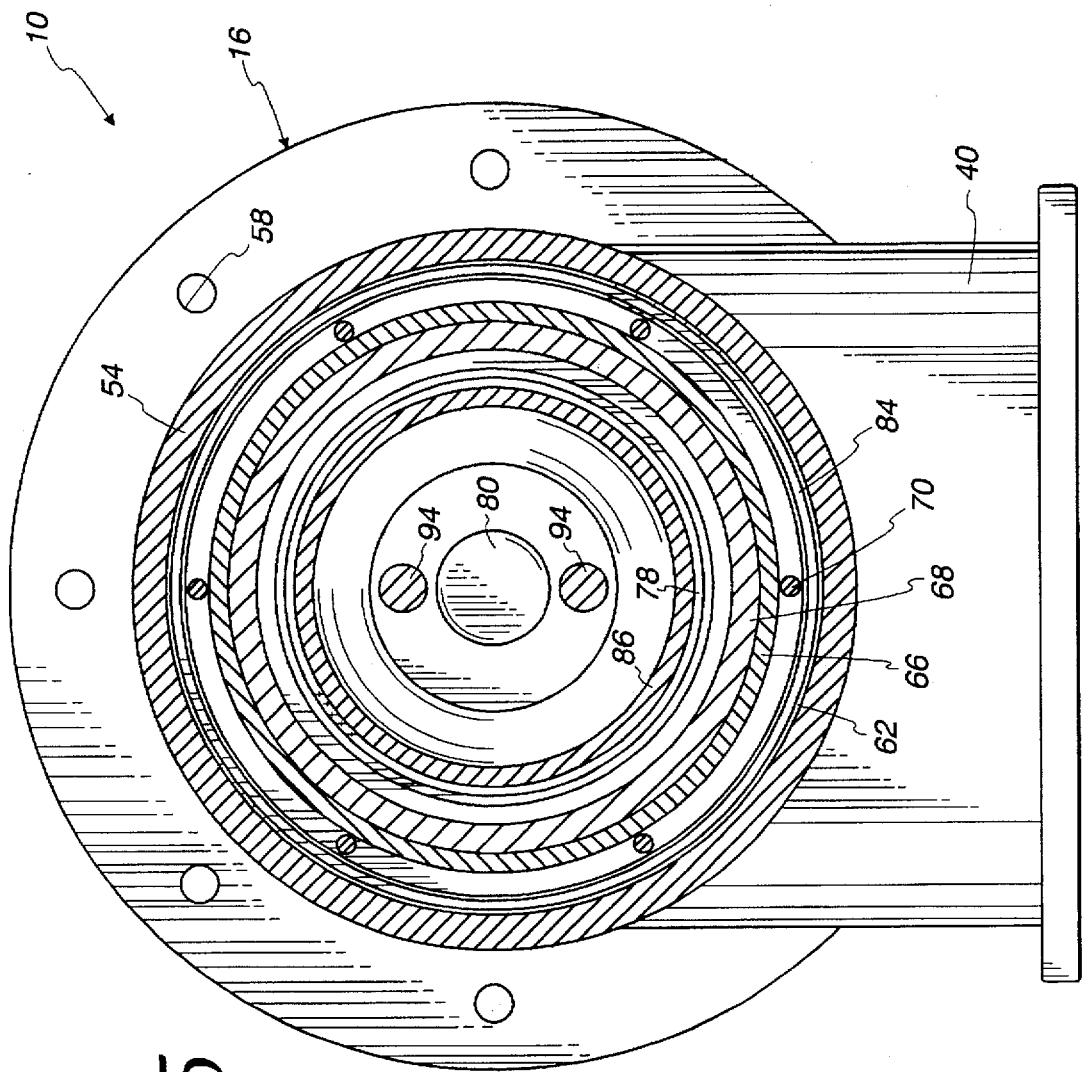
FIG. 5 is a cross-sectional view taken along the line 5—5 of FIG. 2.
Figure 6:
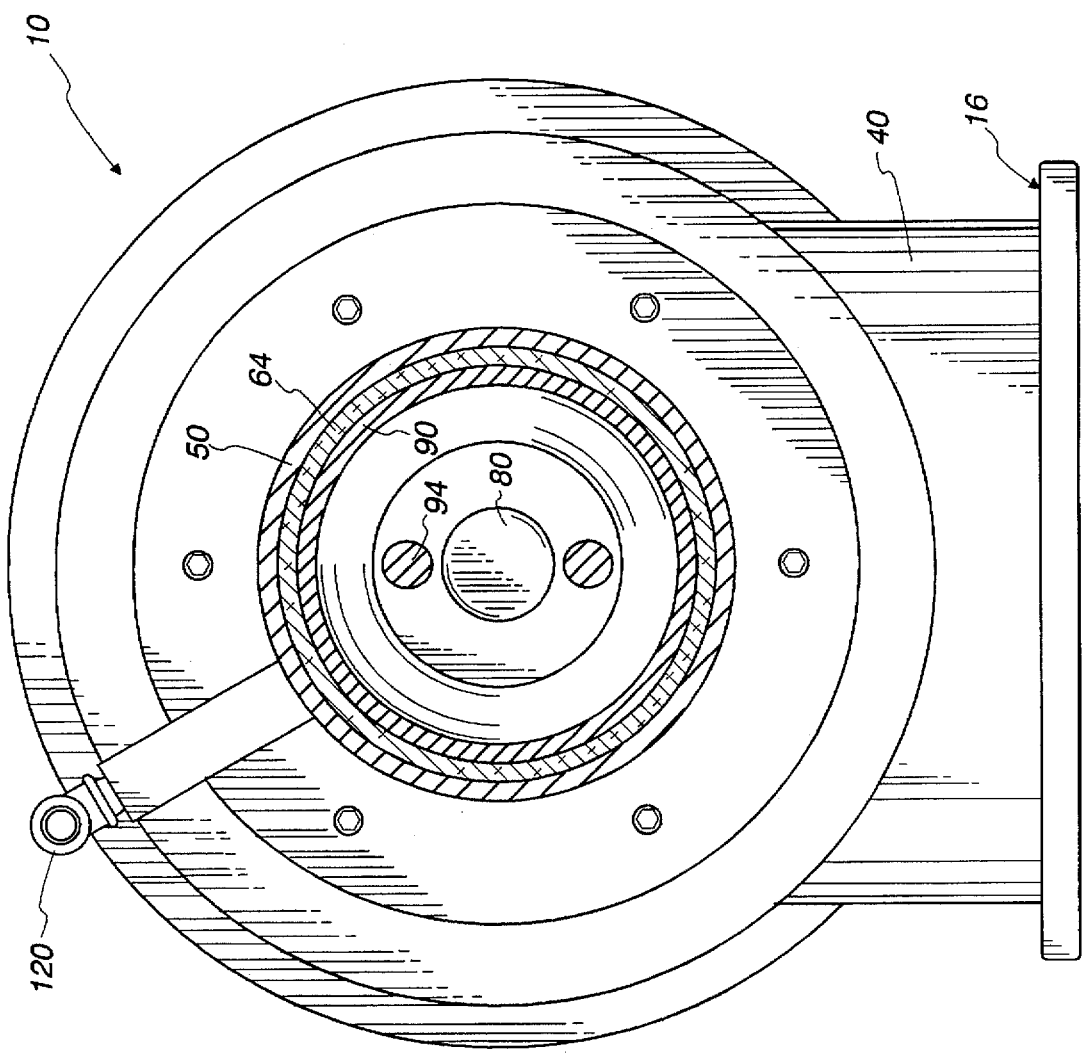
FIG. 6 is a cross-sectional view taken along the line 6—6 of FIG. 2.

Referring now to the drawings, and initially to FIGS. 1–3, a valve mechanism according to the principles of the present invention is generally indicated at 10. The valve mechanism 10 is comprised of a piston-like movable valve assembly generally indicated at 12, and a valve seat 14 which forms part of a housing generally indicated at 16.

The valve seat 14 is preferably formed from a circular plate having a first surface 20 for mounting to an external device, such as the wall of a cooker, and an opposed major surface 22. The valve seat 14 defines an inner bore wall 24 terminating in a chamfered surface 26 having a corner 30. The chamfer 26 and corner 30 are optional, but in the preferred embodiment the corner 30 forms a line contact with the valve element, as will be seen herein. In addition to valve seat 14, housing 16 includes an outer housing member 38. An inlet-outlet port 40 is located adjacent valve seat 14.

The housing 16 further includes portions of a valve actuator, including a mounting flange 42 to which is joined an air cylinder tail fitting 50 by a joining collar 52. A housing wall 54 extends between the connecting flange 42 and an end flange 56. The valve seat 14 is removably attached to end flange 56 by bolt fasteners (not shown) received in mounting holes 58. Bearing pads 62 made of low-friction material, and preferably having a ring or collar shape, are mounted in housing wall 54 to guide the movable valve assembly 12, as will be seen herein. To provide further guiding of the piston-like valve assembly 12, a larger cylindrical shaped bearings 64 is installed in the air cylinder tail fitting 50. An air cylinder wall 66 surrounding the valve assembly, extends between the air cylinder tail fitting 50 and an air cylinder head fitting 68. A series of mounting bolts 70 hold the air cylinder wall 66 in compression between the air cylinder head fitting 68 and the air cylinder tail fitting 50. As can be seen in FIGS. 2 and 3, for example, an annular cavity 76 is formed, opening toward the longitudinal center line of the valve mechanism. An intermediate-sized cylindrical bearing 78 is mounted to the air cylinder head fitting 68 and as will be seen herein, and cooperates with bearing 64 to guide the radially inner portion of valve assembly 12.

Referring again to FIGS. 2 and 3, the valve assembly 12 is comprised of a front portion 80 which includes a cylinder head 82, an outer cylinder wall 84, and an inner cylinder wall 86, having a free end 88. Valve assembly 12 further includes a rear portion comprising a rear cylindrical wall 90 and a rear flange 92. Bolts 94 extend between the rear flange 92 and the valve cylinder head 82, holding the rear cylinder wall 90 in compression. An actuator for moving the cylinder head includes a piston driver 100 which is held in compression between the inner cylinder wall 86 and the rear cylinder wall 90. A radially inwardly directed step is formed in the inner cylinder wall 86, for this purpose. As can be seen in FIGS. 2 and 3, the piston driver 100 is generally L-shaped in cross section, having a longitudinally extending leg 104 in which a plurality of piston rings 106 are formed.

Referring again to FIGS. 2 and 3, a connector fitting 120 is attached to air cylinder tail fitting 50 so as to direct pressurized air through an internal passageway 124 formed in air cylinder tail fitting 50. Connector fitting 120 couples the valve mechanism to a source of pressurized air which is selectively valved on and off to operate the valve mechanism. A second connector fitting 126 couples the valve mechanism 10 to a second source of pressurized air, which is separately controlled between on and off positions, so as to selectively introduce pressurized air through passageway 130 formed in rear flange 92.

Pressurized air entering through fitting 126 travels through passageway 130, to the hollow interior 132 formed within the movable valve assembly 12. A series of orifices 140 is formed in the inner cylinder wall 86, immediately forward of the piston driver 100. It should be borne in mind that the piston driver 100 is affixed to, and travels with the inner cylinder wall 86 and rear cylinder wall 90. As can be seen in FIG. 2, air pressure entering orifices 140 works against air cylinder wall 66 and air cylinder head fitting 68 (both of which are stationary) so as to force the piston driver in a rearward direction, until the piston driver seats against the air cylinder tail fitting 50, arriving at the fully open position shown in FIG. 2.

When valve closing is desired, pressure is released in fitting 126 and an air pressure signal is introduced into fitting 120, traveling through passageway 124 so as to act against the radially directed wall of piston driver 100. The piston driver is free to travel to the left and does so, with bearing 64 riding on the outer surface of rear cylinder wall 90, and with bearing 78 riding on the outer surface of inner cylinder wall 86. The rings 106 formed in the piston driver slide across the radially interior wall of air cylinder wall 66. At the same time, outer cylinder wall 84 slides across bearing 62, as the valve assembly 12 moves to the left, to achieve the fully closed position illustrated in FIG. 3. As can be seen in FIG. 3, the valve cylinder head 82 has mated with bore wall 24 of valve seat 14, bringing corner 30 into line contact with the rounded shoulder 150 of valve cylinder head 82, so as to form a secondary seal.

As will be seen from the above, the valve cylinder head 82 acts as a plunger forming a seal with bore wall 24, in conjunction with the line contact seal of corner 30 with rounded shoulder 150. Further, the valve cylinder head 82 forms an integral portion of the air cylinder, which operates the valve mechanism. The valve mechanism is, for the most part, radially symmetrical about the longitudinal center line. The air cylinder is preferably positioned inwardly of the outermost portions of the valve cylinder head in an arrangement in which guiding forces are exerted on the movable valve assembly, both radially inside the air cylinder, and also radially outside of the air cylinder, thus providing improved stability and reliability of operation. This not only reduces wear on the aforementioned bearing surfaces, and also reduces wear on a resilient seal 170 which seals the product from entering the valve mechanism, when the valve is in an open position. In the preferred embodiment, seal 170 takes the form of an O-ring gasket. With the arrangement of the present invention, smooth mating of the valve cylinder head with the valve seat is assured over the operating life of the valve mechanism.

As will now be appreciated, the valve mechanism 10 can be quickly and easily disassembled for servicing in routine maintenance, as well as scheduled cleaning services. The parts of the valve mechanism most subject to wear are easily replaced, and this includes the valve seat 14 which can be replaced without disturbing the remainder of the valve mechanism.

Also, as will now be seen, the major part of the valve assembly 12 functions as a piston-like actuator for moving the head 82 (formed as an integral part of the piston) back and forth, between open and closed positions. The smallest diameter of the piston-like valve assembly is that of the rear cylinder wall 90/inner cylinder wall 86. As can be seen in FIGS. 2 and 3, this diameter is substantial compared to the length of the valve assembly and stresses tending to bend a valve operator, as may be found in other arrangements, is avoided.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A valve and valve operator apparatus, comprising:
   a housing having a first end with a valve seat and a second end, and a housing wall therebetween;
   a valve assembly including a piston having a first end with a plunger for engaging the valve seat to block flow therethrough, a second end and a piston wall therebetween;
   a sealing ring outwardly extending from the piston wall;
   a cylinder surrounding said piston, having a fist end adjacent said valve seat and a second end remote from said valve seat;
   a mounting means for mounting the cylinder about said piston;
   first signal connection means for connecting a first pressure signal between said sealing ring and the second end of said cylinder;
   second signal connection means for connecting a second pressure signal between said sealing ring and the first end of said cylinder;
   at least a portion of said piston movable back and forth in said cylinder with pressure signals alternately applied to said first and said second signal connection means, whereby said plunger is moved into and out of engagement with said valve seat; and
   wherein said sealing ring is L-shaped cross-section with one leg of the L extending along the cylinder wall in sliding sealing contact therewith.

2. The apparatus of claim 1 wherein said mounting means is located adjacent the second end of the housing for cantilever mounting of said cylinder.

3. The apparatus of claim 2 wherein said piston further comprises a guide cylinder extending from the first end of said piston so as to be spaced from said piston wall in sliding contact with said housing wall.

4. The apparatus of claim 1 wherein said sealing ring is located between said cylinder wall first and second ends.

5. The apparatus of claim 4 wherein said second signal connection means comprises an end wall between said cylinder and said piston wall, defining an aperture communicating with sealing ring.

6. The apparatus of claim 5 wherein said end wall has a sealing portion extending along the piston wall, with bearing means between said sealing portion and said piston wall.

7. The apparatus of claim 4 wherein said second signal connection means comprises an end wall between said cylinder and said piston wall, defining an aperture communicating with sealing ring.

8. The apparatus of claim 4 wherein said second end of said piston includes a piston end wall defining an aperture comprising a portion of said first signal connection means and said piston wall defines an aperture communicating with sealing ring and comprising a further portion of said first signal connection means.

9. The apparatus of claim 8 wherein said sealing ring is L-shaped cross-section with one leg of the L extending along the cylinder wall in sliding sealing contact therewith.

10. The apparatus of claim 9 wherein said piston is formed in two partly overlapping parts aligned along a common axis, with one of the parts having a stepped wall and the other part having a free end, and said sealing ring is separately formed, with one leg compressed between the stepped wall of one part and the free end of the other part.

11. The apparatus of claim 1 wherein said piston is formed in two partly overlapping parts aligned along a common axis, with one of the parts having a stepped wall and the other part having a free end, and said sealing ring is separately formed, with one leg compressed between the stepped wall of one part and the free end of the other part.

12. The apparatus of claim 1 wherein said first end of said housing includes a ring-shaped body with a valve seat defining a flow path aperture, with the body removably attached to said housing wall.

13. The apparatus of claim 1 wherein said housing wall includes a radially extending flow conduit for flow communication with said flow path aperture.

14. The apparatus of claim 1 wherein said first end of said cylinder wall has a sealing portion extending along the piston wall, with bearing means between said sealing portion and said piston wall.

15. The apparatus of claim 1 wherein said end wall is separately formed with respect to the housing wall and is removably joined to the second end of the housing wall.

16. A valve and valve operator apparatus, comprising:

a housing having a first end with a valve seat and a second end, and a housing wall therebetween;

a valve assembly including a piston having a first end with a plunger for engaging the valve seat to block flow therethrough, a second end and a piston wall therebetween;

a guide cylinder extending from the first end of said piston so as to be spaced from said piston wall in sliding contact with said housing wall;

a sealing ring between the first and second ends of the piston, outwardly extending from the piston wall;

a cylinder surrounding said piston, having a fist end adjacent said valve seat and a second end remote from said valve seat;

a mounting means for spacing the cylinder about said piston, including a pair of opposed cavity walls spaced along and cooperating with the piston wall to form a pressure-tight cavity disposed about said sealing ring, with at least one of said cavity walls coupled to said housing to mount said piston and said cylinder therefrom;

first signal connection means for connecting a first pressure signal between said sealing ring and one of the cavity walls;

second signal connection means for connecting a second pressure signal between said sealing ring and the other of the cavity walls;

at least a portion of said piston movable back and forth in said cylinder with pressure signals alternately applied to said first and said second signal connection means, whereby said plunger is moved into and out of engagement with said valve seat; and wherein said sealing ring is located between said cylinder wall first and second ends and has an L-shaped cross-section with one leg of the L extending along the cylinder wall in sliding sealing contact therewith.

17. The apparatus of claim 16 wherein said cavity walls have a sealing portion extending along the piston wall, with bearing means between said sealing portion and said piston wall.

18. The apparatus of claim 16 wherein said piston further comprises a guide cylinder extending from the first end of said piston so as to be spaced from said piston wall in sliding contact with said housing wall.

19. The apparatus of claim 16 wherein said sealing ring is located between said cylinder wall first and second ends and has an L-shaped cross-section with one leg of the L extending along the cylinder wall in sliding sealing contact therewith.

20. The apparatus of claim 16 wherein said first end of said housing includes a ring-shaped body with a valve seat defining a flow path aperture, with the body removably attached to said housing wall.

21. The apparatus of claim 16 wherein said housing wall includes a radially extending flow conduit for flow communication with said flow path aperture.

22. The apparatus of claim 16 wherein said piston is formed in two partly overlapping parts aligned along a common axis with one of the parts having a stepped wall and the other part having a free end, and said sealing ring is separately formed, with one leg compressed between the stepped wall of one part and the free end of the other part.

* * * * *

UNITED STATES PATENT AND TRADEMARK OFFICE
CERTIFICATE OF CORRECTION

PATENT NO. : 5,762,316
DATED : June 9, 1998
INVENTOR(S) : Donald Lee Barnett

It is certified that error appears in the above-indentified patent and that said Letters Patent is hereby corrected as shown below:

```
Column 4, line 43, change "fist" to -- first --.
          line 60, after "L-shaped" insert -- in --.
Column 4, line 43, change "fist" to -- first --.
Column 5, line 23, after "L-shaped" insert -- in --.
Column 6, line 6, change "fist" to -- first --.
Column 6, line 52, after "axis" insert a comma (,).
```

Signed and Sealed this

Third Day of August, 1999

Attest:

Q. TODD DICKINSON

*Attesting Officer*  *Acting Commissioner of Patents and Trademarks*